United States Patent
Kampert

(10) Patent No.: US 7,945,518 B2
(45) Date of Patent: May 17, 2011

(54) METHOD, PROCESSOR AND MAIL TRANSPORT SYSTEM FOR ASSOCIATING INFORMATION WITH A MAIL ITEM

(75) Inventor: Werner Kampert, Hamburg (DE)

(73) Assignee: Francotyp-Postalia GmbH (DE)

( * ) Notice: Subject to any disclaimer, the term of this patent is extended or adjusted under 35 U.S.C. 154(b) by 951 days.

(21) Appl. No.: 11/441,741

(22) Filed: May 25, 2006

(65) Prior Publication Data
US 2007/0050200 A1 Mar. 1, 2007

(30) Foreign Application Priority Data
May 31, 2005 (DE) .......................... 10 2005 025 323

(51) Int. Cl.
*G06F 17/00* (2006.01)
(52) U.S. Cl. .......................................... 705/60; 705/401
(58) Field of Classification Search .................. None
See application file for complete search history.

(56) References Cited

U.S. PATENT DOCUMENTS

| 2004/0049314 | A1 | 3/2004 | Sansone |
| 2004/0122777 | A1* | 6/2004 | Sansone ........................ 705/402 |
| 2004/0246099 | A1 | 12/2004 | Tuttle |
| 2005/0137990 | A1* | 6/2005 | Mayer et al. .................. 705/410 |

FOREIGN PATENT DOCUMENTS

| EP | 0 697 261 | | 2/1996 |
| EP | 0697261 | A2 * | 2/1996 |
| WO | WO 00/16278 | | 3/2000 |
| WO | WO 01/26047 | | 4/2001 |
| WO | WO 03/051538 | | 6/2003 |

OTHER PUBLICATIONS

"Time to digitize postal services?" Sambandaraksa, Don, Bangkok Post, Jul. 21, 2004.*

* cited by examiner

*Primary Examiner* — Rutao Wu
(74) *Attorney, Agent, or Firm* — Schiff Hardin LLP

(57) ABSTRACT

In a method, data processor and mail transport system for a mail item, the mail item has an electronic memory device physically associated therewith that contains electronically stored information that is relevant for the transport of the mail item.

10 Claims, 8 Drawing Sheets

METHOD, PROCESSOR AND MAIL TRANSPORT SYSTEM FOR ASSOCIATING INFORMATION WITH A MAIL ITEM

BACKGROUND OF THE INVENTION

1. Field of the Invention

The present invention concerns a method for association of information with an item of mail, in particular a letter. It furthermore concerns a method for transport of mail pieces, a data processing device that can be used in connection therewith, a system for transport of mail items as well as a corresponding mail item.

2. Description of the Prior Art

In the presently-used postal transport systems, the mail items (such as letters and packages) are typically provided with a value marking or a corresponding franking imprint that, among other things, serves as evidence for the payment of the necessary transport fees of the selected postal carrier. For this purpose, the value marking or the franking imprint normally contains a series of graphical verification features, for example alphanumeric characters, barcodes etc. or other physical verification features (colors, materials, textures etc.) that contain information in coded or uncoded form. This information (possibly in combination) enables it to be determined whether the transport fees have been paid.

After the mail item has been transferred to the postal carrier, the carrier uses the value marking or the franking imprint in order to verify whether the fees necessary for the transport have been paid. If the verification is successful, the postal carrier takes over the transport of the mail piece to the desired location; otherwise, it rejects the item (if applicable).

In the verification of the value marker or of the franking imprint, the postal carrier has previously been bound to an optical detection of the verification features of the value marking or franking imprint. An automated, optical detection of the verification features is of interest for a fast processing of the mail items. For this purpose it is necessary to elaborately separate the mail pieces and to individually, optically detect each mail item. If the automated optical detection fails, a visual check that is very time-consuming and costly in terms of personnel must ensue.

In the verification of the value marking or franking imprint, a frequent problem is that graphical verification features printed on the mail piece cannot be reliably read automatically, such that the elaborate visual check by corresponding personnel must ensue. The cause for this can be a lack of quality of the printer generating the imprint but it can also be an unsuitable (for example too dark) document on which no contrast of the inherently correct imprint that is sufficient for the automatic detection. The imprint can also be wholly or partially destroyed, for example by moisture, tearing of the paper, etc.

SUMMARY OF THE INVENTION

An object of the present invention is to provide a method, a data processing device as well as a mail item of the aforementioned type that are less susceptible to the aforementioned disadvantages, and which in particular enable a simple, fast and reliable, automated detection of the information linked with the mail item.

The present invention is based on the recognition that a simple, fast and reliable automated detection of the information linked with the mail item is possible when an electronic memory in which the appertaining information is stored is associated with the mail item. According to the invention, in an association step an electronic memory device is associated with the mail item and information is entered into the memory device in a storage step. The information can then be read out from the memory reliably without problems and further processed at a later point in time. The memory can contain, for example, information with regard to the payment of the transport fee for the mail item. This can then simply be read from the memory for verification of the payment and processed further.

The writing or readout of the memory device can ensue in any suitable manner. The memory device can exhibit a corresponding interface to be contacted by a write device (writer) or read device (reader), via which interface the connection to the memory device can be established for writing or reading the information. The writing or reading of the information preferably ensues without contact, since then a particularly simple automation of the appertaining process is possible. Therefore the information is entered into the memory device via a wireless connection in the storage step.

An advantage is that, given a wireless connection between the writer or reader and the memory device (if applicable dependent on the selected technology of the wireless connection) a distinctly less precise spatial positioning must be present than is the case with the known methods, in which a print image or the like is applied on a substrate to link the information or the print image or the like is detected in optical ways to read the information. The associated writers or readers are thereby significantly simplified since only a comparably rough positioning of the memory device is required. The processing speed is thereby increased in an advantageous manner.

In principle, the memory device can be designed in any suitable manner as long as it ensures a reliable storage of the introduced information with a correspondingly small size and light weight. It can be an active memory device or a passive memory device that embodies one or more memory modules. It is preferably a non-volatile memory, such that the information is also retained without energy feed over a longer span of time. It is furthermore preferably fashioned as a type of active or passive transponder that is supplied with the required energy (for example for write or read events) via its own energy source (active transponder), or an external energy source (passive transponder). The memory device therefore preferably is at least one writeable RFID memory unit.

The memory device can be connected with the mail item in any suitable manner. The memory device can be adhered to a part of the mail item or otherwise be mechanically connected; in particular it can be integrated or embedded in a component of the mail item. Thus the mail item can have an outer envelope and the memory device can be connected with the outer envelope in the association step. In other embodiments of the invention, the mail item has an outer envelope and a shipping item contained therein, and the memory device is connected with the shipping item in the association step.

The association step and the storage step can ensue in an arbitrary temporal relation to one another. Both of these steps can temporarily overlap wholly or partially. The association step preferably ensues temporally before the storage step. The outer envelope (for example a blank letter envelope) and/or a component of the shipping item (for example a blank sheet of letter paper) can already be provided with the memory device in advance before the mail item is assembled. The writing of the first memory device then can ensue in the course of the generation and assembly of the mail item. This has the advantage that the generation and assembly of the mail item can ensue in the known manner and without additional handling steps for the association of the memory device.

The storage step can ensue in any environment or at an arbitrary location at which a writer is available. If the memory device is located, for example, on a sheet of paper, the storage step can ensue, for example, in a printer that is used for printing the paper and that includes a writer for writing the memory device. This has the advantage that, in the printing, a precisely-defined spatial relationship exists between the printer and the paper (and therewith also the memory device), which ensures a simple and reliable writing of the memory device.

The storage step preferably ensues while the memory device is spatially associated with a franking machine that includes a writer for writing to the memory device. Due to the spatial relationship of the memory device to the franking machine (which relationship is present in the franking machine and thus is sufficiently precisely defined), both a memory device connected with the outer envelope (for example a letter envelope) and a memory device connected with a component of the shipping good (for example a sheet of letter paper) are written. This additionally has the advantage that the verification data normally generated anyway for the postage payment in a security module of the franking machine can be written into the memory device in a simple manner as verification data for the postage payment.

In a preferred embodiment of the inventive method, the aforementioned information is first information and a franking imprint associated with the mail item includes second information that is generated in a printing step. For example, in the case of determination of a possible inconsistency of the first data stored in the first memory device, the franking imprint can then be used in order to check the integrity and/or authenticity of the first data. For this purpose, it is preferable that the first information and the second information have a predetermined relationship to one another. The first information can represent at least one first item of partial information (i.e. a portion of the total information to be stored), while the second information represents at least one second item of partial information. The first partial information has a predetermined relation to the second partial information (in particular is identical with the second partial information).

In principle, arbitrary data or information can be written into the memory device. The first information preferably includes at least one first partial information associated with the mail item. In the sense of the present invention, this first partial information associated with the mail item is information that relates to specific features of the mail item or reproduces these. These features of the mail item can be physical features such as weight, mass etc., but can also be information-related features such as, for example, sender, recipient, selected mail carrier, or the physical or information-related content of the mail item. With this first partial information, using the detectable features of the mail item, it is possible to verify whether the information stored in the first memory device actually exhibits the predetermined relation to the mail item.

The first partial information can be, for example, all or parts of the data that are typically contained in a modern franking imprint such mandated, for example, by the Deutsche Post AG according to its FRANKIT® specifications or by the United States Postal Service (USPS) according to its Information-Based Indicium Program (IBIP) specifications. As mentioned, however, the first partial information can likewise be information regarding the information-related content of the mail item, up to the complete information-related content of the mail item (for example thus the entire text of a letter).

The first information can include information related to at least one postage-relevant parameter (weight, size, shipping type etc.) of the mail item as the first partial information. Additionally or alternatively, the first information can include information regarding an additional service in the transport of the mail piece as the first partial information. Additionally or alternatively, the first information can include information regarding a postage paid or to be paid (for example postage sum, value etc.) for the transport of the mail item as the first partial information. Additionally or alternatively, the first information can be information regarding the sender of the mail item (for example sender, sender address or portions thereof, for example the postal code etc.) as the first partial information. Additionally or alternatively, the first information can be information regarding the receiver of the mail item (for example receiver, receiver address or portions thereof, for example the postal code etc.) as the first partial information. Additionally or alternatively, the first information can be information regarding the carrier of the mail item (for example carrier, delivery location etc.) as the first partial information. Additionally or alternatively, the first information can include information regarding the content of the mail item (for example number of the pages, content such as checks, check cards etc.) as the first partial information. As mentioned, the first information also can be information that relates to the information-related content of the mail piece, for example up to the entire text of the letter.

Additionally or alternatively, the first information can include information regarding the site of the implementation of the storage step and/or the point in time of the implementation of the storage step and/or those responsible for the implementation of the storage step as a first partial information. The information regarding those responsible for the implementation of the storage step can be, for example, a corresponding identification of the agents or the responsible persons. It can likewise be a corresponding identification (serial number etc.) of the device that implemented the storage step. If this information is written into the memory device at specific transport stations of the mail item, among other things it is herewith possible in a simple manner to store a transport history of the mail item in the memory device that can then be read out therefrom at an arbitrary point in time. In other words, a subsequent shipment tracking (what is known as offline tracking and tracing) can be achieved here in a simple manner. This has the advantage that interaction with a shipment tracking system does not have to exist at all transport stations. Rather, it can be sufficient to read out the prior transport history of the mail piece from the memory device at individual transport stations (possibly even only at a single transport station) and to transmit this transport history to the shipment tracking system.

In a preferred embodiment of the invention, the first information additionally includes authentication information as the second partial information that authenticates the first partial information. This authentication information can have been generated in any suitable manner. For example, the authentication information can be a well known Message Authentication Code (MAC) or a well known digital signature over the first partial information.

The present invention furthermore concerns a method for transport of mail items, in particular letters, in which the mail item passes through at least one transport station in a transport step. According to the invention, in a storage step, transport station information regarding the passage of the transport station is introduced into an electronic memory device associated with the mail item. It is thus possible in a simple manner to detect and store the transport history of the mail piece already set forth above, i.e. to achieve the offline shipment tracking cited above.

In order to realize the offline shipment tracking, the mail item advantageously passes through at least one further (second) transport station subsequent to the aforementioned (first) transport station, and second transport station information regarding the passage of the second transport station is inserted into the memory device in a second storage step.

The respective transport station information preferably includes information regarding the transport station, in particular information regarding the site and/or the operator of the transport station. Additionally or alternatively, the transport station information can include information regarding the point in time of the passage of the transport station.

The present invention furthermore concerns a method for transport of mail items, in particular letters. According to the invention, in a read step information is read from an electronic memory device associated with a mail item, and a transport of the mail piece ensues in a transport step dependent on the result of the read step, and/or an acknowledgement information is generated in an acknowledgement step dependent on the result of the read step.

In all three cases, the simple and reliable readout of the information from the memory device associated with the mail item (as described above) enables a simple and fast handling and processing of the mail items as needed, without the uncertainty associated with a conventional optical read process.

In the creation of the acknowledgement information dependent on the result of the read step, a specific device with a corresponding reader to read the information stored in the memory device can automatically generate an acknowledgement for the input of the mail item, dependent on the result of the read step. For example, a letter box into which letters are dropped can automatically read out the information (stored in the memory device) of such a letter and create an acknowledgement for the input of the letter using this read information. The letter box can include a time stamp device that then acknowledges the input point in time of the letter. This is particularly advantageous for letter boxes of agencies or courts etc. in which letters with date-sensitive documents can be deposited. In this context it is particularly advantageous when the read information about which the acknowledgement is created still contains the aforementioned information about the physical and/or information-related content of the letter.

It is hereby understood that in all cases, depending on the security level of the data to be processed, suitable known security mechanisms (such as encryption, generation of digital signatures or other security codes etc.) are used in order to ensure the integrity and authenticity of the processed data. In particular such security mechanisms can also be implemented in the memory device.

Given the transport of the mail item dependent on the result of the read step, a sorting or distribution of the mail items in a distribution center is effected using the information stored in the memory device with regard to the recipient and/or information stored in the memory device with regard to the carrier. A sorting according to the selected carrier can be effected before, during or after the sorting according to the receiver in a mail distribution center in which (due to the first information, which is simple to read) mail items to be transported arrive via different carriers.

In preferred embodiments of the inventive method, the transport of the mail item in the transport step is initiated by the result of the read step. For example, the mail item may be transported only when the read step has led to a predetermined result.

Likewise, the further transport of mail items may ensue only when it is detected via the readout of the information or in the course of the readout of the information, that a specific number of mail items has accumulated at a specific site or at least one mail item has already been present at this site for a predetermined duration. In preferred embodiments of the inventive method, the reading of the information ensues in the read step via a storage device for mail pieces, in particular a letter box, and in the transport step a re-forwarding of the mail items from the storage device is triggered as soon as the arrival of a predetermined number of mail pieces in the storage device is detected in the read step or a predetermined time span has elapsed since the detection of the input of the first letter into the storage device in the preceding read step.

As explained above, the memory device can be any suitable memory device. Here again, the memory device preferably is formed by at least one RFID memory unit. Analogous to the statements above, the information is also preferably read out from the memory device in the read step via a wireless connection. Furthermore, the information is preferably associated with the mail item (with one of the versions of the inventive method described above) before the read step.

In this context, the carrier can give a discount with regard to the transport fee given the use of mail items that are inventively provided with the correspondingly-described memory device. It is therefore preferable that the calculation of the transport fee for the mail item that ensues in a calculation step, with the calculation of the transport fee being dependent on the presence of the memory device and/or dependent on the information content of the information stored therein.

The present invention furthermore concerns a data processing device for association of information with a mail item, in particular with a letter. According to the invention, the data processing device includes a writer for writing information into an electronic memory device connected with, or to be connected with, the mail item. The inventive data processing device can be used in connection with the embodiments described above. The embodiments and advantages described above can be achieved to the same degree with the inventive data processing device. The content of the information written into the memory device with the inventive data processing device is likewise described above, such that the above embodiments are also referenced in this regard.

The writer is preferably designed to write into the first memory device via a wireless connection. In order to be able to utilize the aforementioned RFID memory elements and their advantages, the writer is designed to write into at least one RFID memory unit of the memory device.

The data processing device can be any arbitrary data processing device that the mail item passes on its transport path, and which is thus suitable for writing information into the memory device. It can be a franking machine, or it can be a component of a storage device for mail pieces, in particular a component of a letter box. It can likewise be a component of a transport device for mail pieces, in particular a component of a transport vehicle or a sorting system. This is particularly advantageous for the offline shipment tracking cited above.

In order to not have to equip mail items with a memory device in advance, preferably the mail item has an outer envelope and the data processing device has a connection device to connect the memory device with the outer envelope. The connection device preferably is an output device for output of carrier devices bearing a memory device to be connected with the mail item. The output device is designed for connection of the carrier device with the mail item, in particular for connection of the carrier device with the mail item before the writing of the memory device.

The inventive data processing device preferably is a printing device for application of a franking imprint containing second information onto the mail item as described above.

The present invention furthermore concerns a system for transport of mail items, in particular letters, with a number of system components for transport of mail items. According to the invention, a first system component is a reader for reading information from an electronic memory device associated with a mail item. The first system component or a second system component that can be connected with the first system component is fashioned to influence the transport of the mail item dependent on the result of the read process of the reader. Additionally or alternatively, the first system component or a second system component that can be connected with the first system component is designed to create acknowledgement information dependent on the result of the read process of the reader. With this, the advantages and embodiments described above in connection with the inventive method for transport of mail items can be achieved to the same degree, such that reference is made in this regard to the embodiments above.

The second system component is preferably a data center that can be connected with the first system component via a communication link, such as a wireless communication link. The first system component is then a storage device for mail pieces, in particular a mail box.

In preferred embodiments of the inventive system, an inventive data processing device (in particular an inventive franking machine) is provided as a third system component.

Shipment tracking (which is frequently also designated as tracking and tracing) can be achieved in a simple manner in embodiments of the inventive system. According to the invention, a number of fourth system components are respectively provided with a reader to read information from the electronic memory device associated with a mail item. A fifth system component that can be connected with the fourth system component generates transport progress information for individual mail items from the results of the read processes in the fourth system components. For example, the transport progress information then respectively contains an indication that the appertaining mail item has arrived at the appertaining fourth system component or has left it again. The fourth system component can be, for example, a distribution center, a transport unit (for example a delivery vehicle etc.) or even the deposit mail box or the like.

The present invention furthermore concerns a system component for an inventive system for transport of mail items. The system components can be, for example, a storage device for mail items, in particular a mail box.

The present invention also concerns a mail item, in particular a letter. According to the invention, the mail piece has an electronic memory device. The inventive mail piece represents the basis for the realization of the methods and devices described above. The advantages and embodiments described above can be realized to the same degree with said inventive mail item, such that the embodiments above are referenced in this regard.

In preferred embodiments of the inventive mail item, an outer envelope is provided and the first memory device is connected with the memory device. In further embodiments, in addition to the outer envelope the mail item has a shipping item contained therein, and the memory device is connected with the shipping item. The memory devices described above are used as the memory device. The memory device preferably has at least one RFID memory unit. The above embodiments are also referenced here with regard to the information stored in the memory device.

DESCRIPTION OF THE PREFERRED EMBODIMENTS

In the following, a first preferred embodiment of the inventive system 1 for transport of mail items is described under reference to FIGS. 1A through 1D, with which a first preferred embodiment of the inventive method for transport of mail pieces can be implemented.

FIGS. 1A through 1D show schematic representations of individual parts of the system 1. Steps that designate individual transitions between different states or transport stations regarding processed mail pieces are symbolized by block arrows in FIGS. 1A-1D.

Figure 1A:
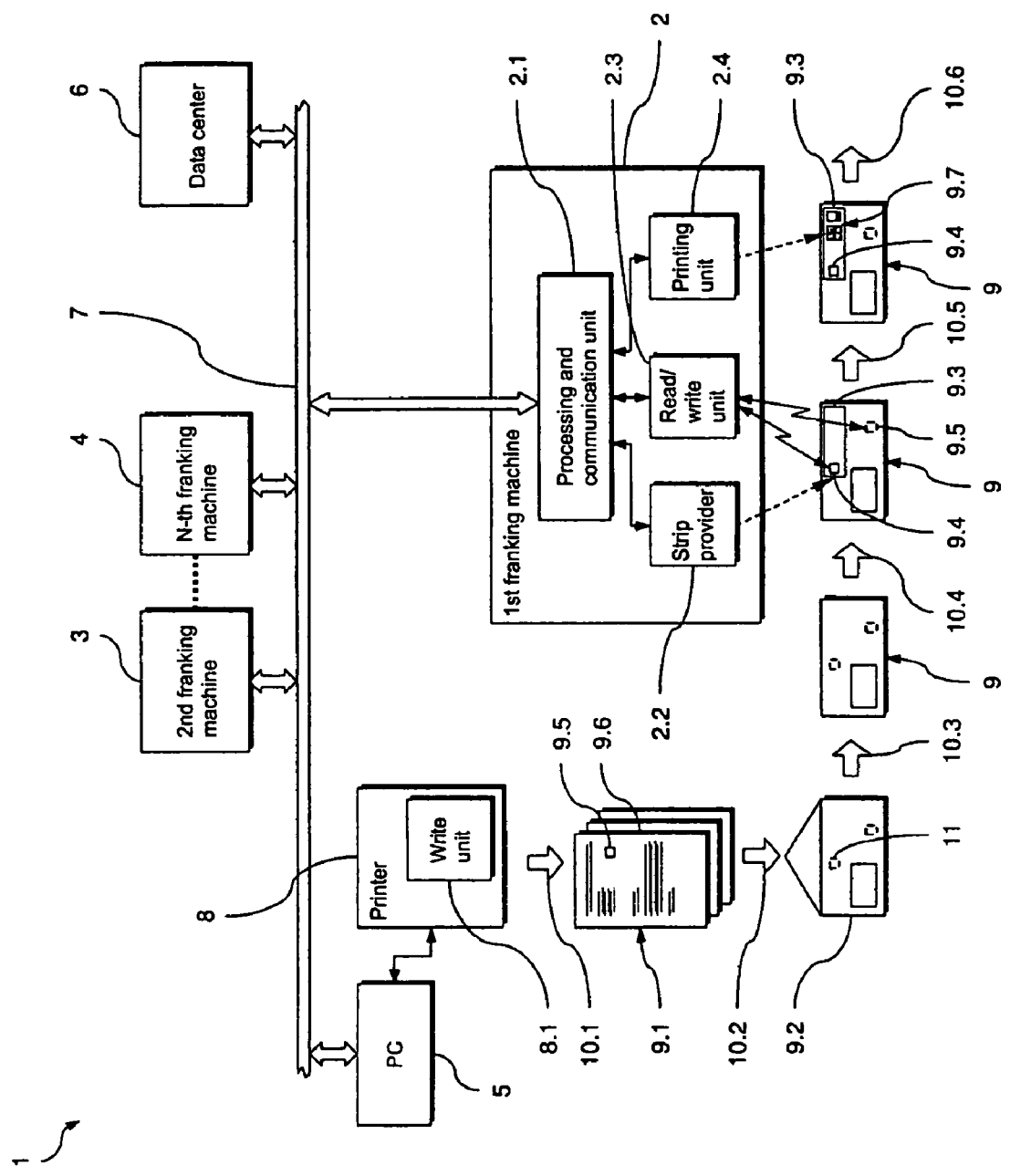
FIG. 1A schematically illustrates a first part of a preferred embodiment of the inventive system for transport of mail pieces with which can be implemented a first preferred embodiment of the inventive method for transport of mail pieces.
Figure 1B:
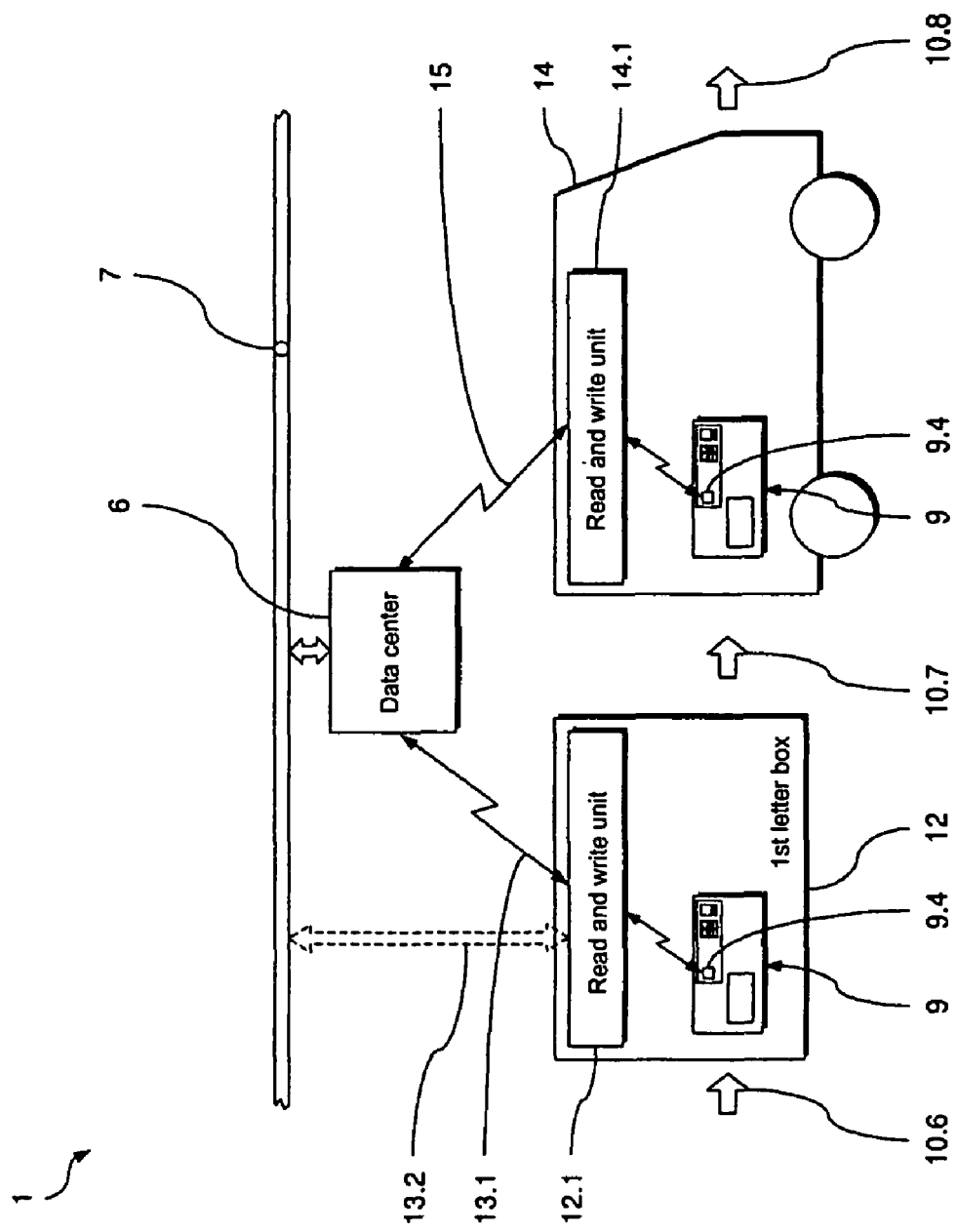
FIG. 1B schematically illustrates a second part of the system from FIG. 1A.
Figure 1C:
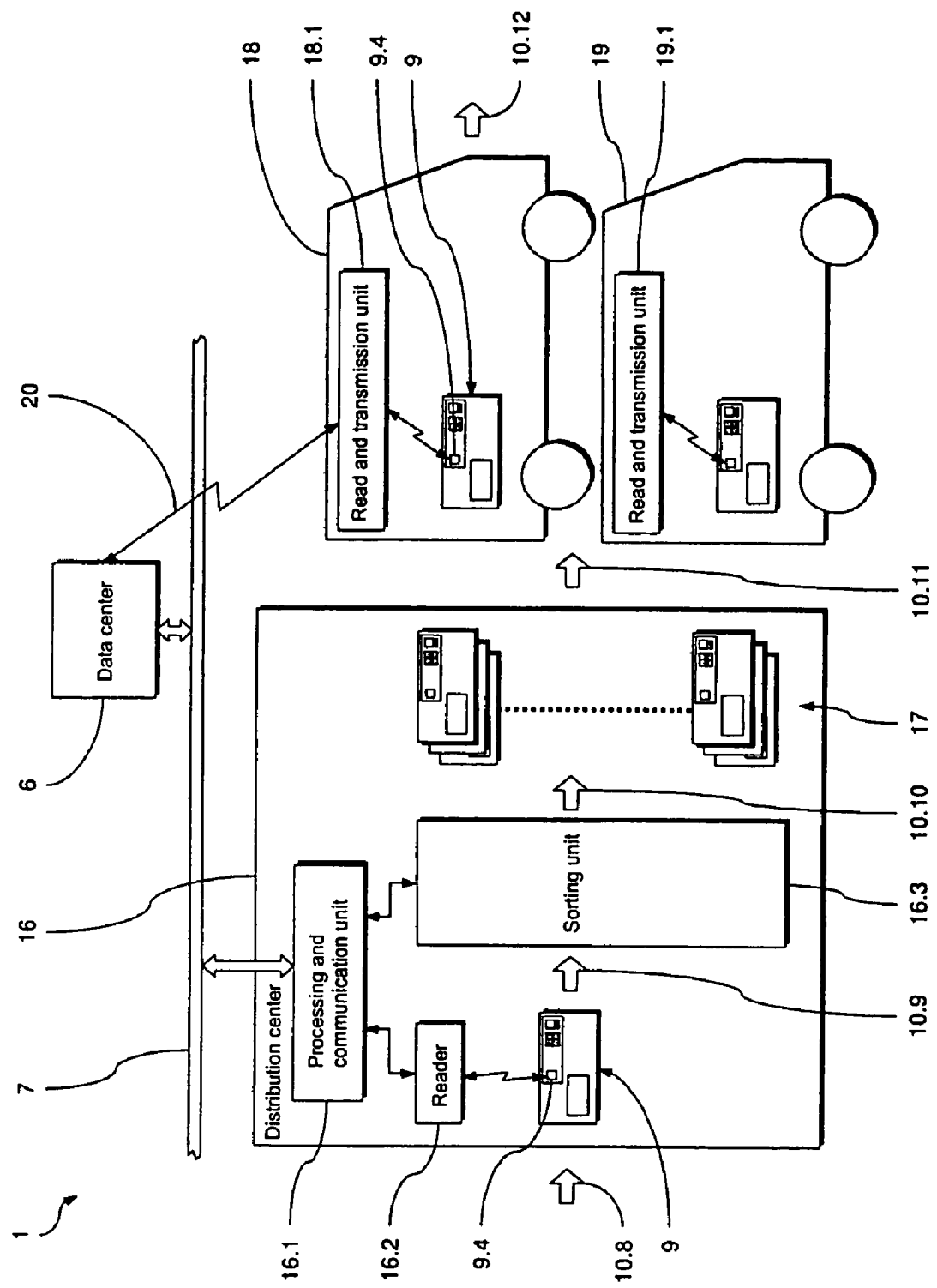
FIG. 1C schematically illustrates a third part of the system from FIG. 1A.
Figure 1D:
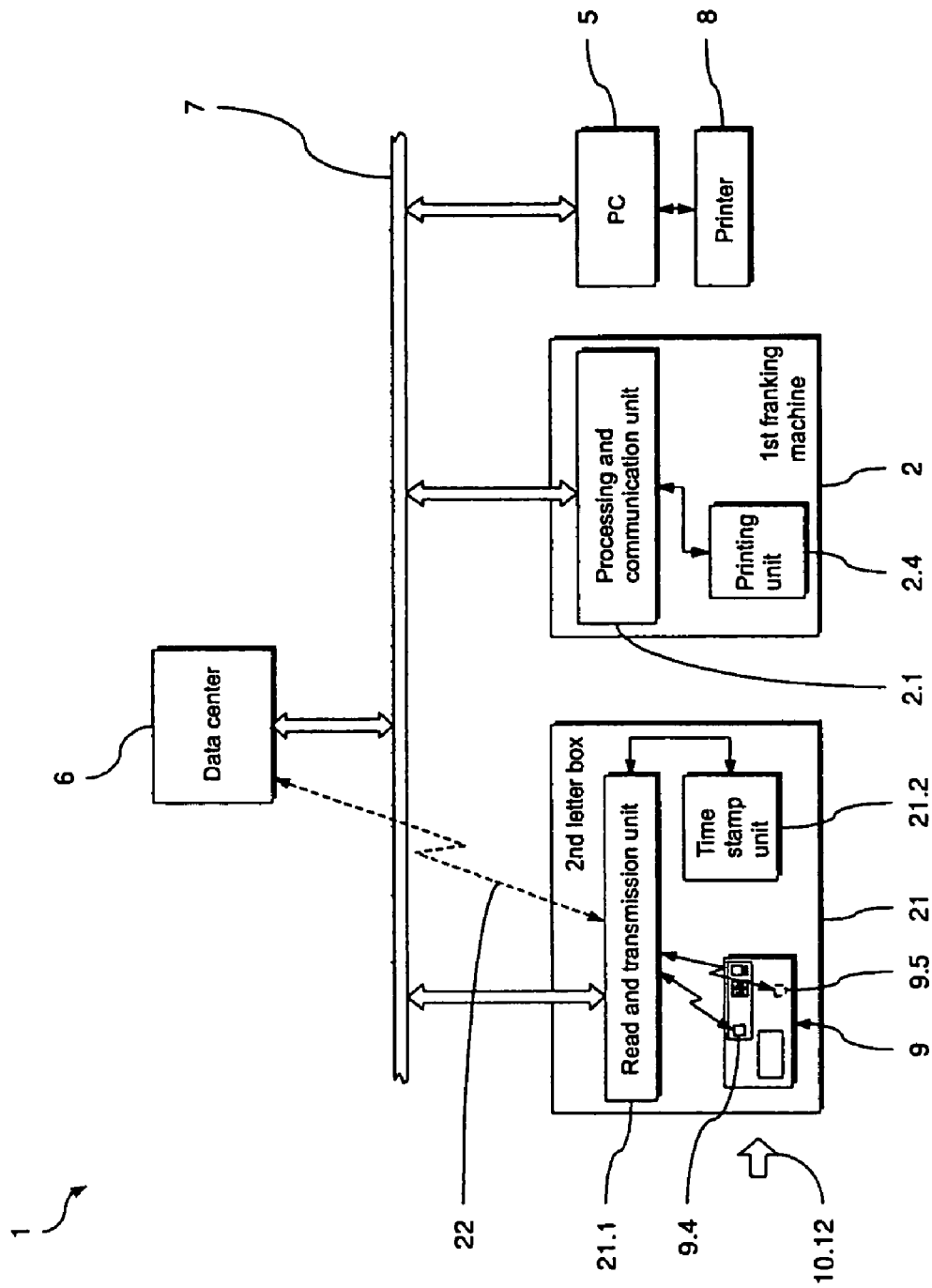
FIG. 1D schematically illustrates a fourth part of the system from FIG. 1A.

As can be seen from FIG. 1A, among other things the system 1 has a series of N franking machines 2, 3, 4, a personal computer (PC) 5 and a data center 6. The franking machines 2, 3, 4 and the PC 5 each can be connected with the data center 6 via a telecommunication connection (for example a data network 7).

A mail item in the form of a letter 9 is created with the aid of the PC 5. For this purpose, a printer 8 is connected to the PC 5. As a first component of the letter 9, a multi-page document 9.1 with a specific document content (for example a legal pleading) is generated with the PC 5. The document is then printed out via the printer 9 in a step 10.1, folded in a step 10.2 and inserted into a letter envelope 9.2. The letter envelope 9.2 represents a second component of the letter 9.

The letter 9 is sealed in a step 10.3 and inserted into the franking machine 2. In a step 10.4, the letter 9 in the franking machine 2 is provided with a franking strip 9.3 (label) by a strip provider 2.2 (connected with the processing and communication unit 2.1) in an association step, which franking strip 9.3 is glued onto the letter 9. The franking strip 9.3 serves as a printing area for the later franking imprint. Additionally, a memory device (fashioned as a type of transponder) in the form of an RFID unit 9.4 is connected with the franking strip 9.3.

In the step 10.4, in a storage step, via a wireless connection the first RFID unit 9.4 is written with first information by a write/read unit 2.3 (connected with the processing and communication unit 2.1) of the franking machine 2. The write/read unit 2.3 writes the first RFID unit 9.4 according to a method which is sufficiently known for such RFID units with corresponding transmission and reception components, such that this need not be discussed in detail herein.

During the write process into the first RFID unit 9.4, the letter 9 is already located in the feed channel of the franking machine 2 in which the franking imprint is then also generated. Due to the (typically precisely) defined letter handling in the franking machine 2, the letter 9 (and therewith the RFID unit 9.4 attached thereto) are accordingly located in a comparably very precisely-defined spatial relationship with the write/read unit 2.3, such that the write process proves to be particularly simple and reliable.

The first RFID 9.4 is written by the write/read unit 2.3 with first information that includes at least first partial information associated with the letter 9. In the sense of the present invention, this first partial information associated with the letter 9 is information that relates to specific features of the letter 9, or represents these. These features of the letter 9 can be physical features such as weight, mass etc., but can likewise be information-related features such as, for example, sender, receiver, selected postal carrier, however even the physical or information-related content of the letter 9. With this first partial information, using detectable features of the letter 9 it is possible to verify whether the first information stored in the first RFID unit 9.4 actually exhibits the predetermined relation to the letter 9.

The first partial information can be, for example, all or portions of the data that are typically contained in a modern franking imprint as stipulated, for example, by the Deutsche Post AG according to its FRANKIT® specifications or by the United States Postal Service (USPS) according to its Information-Based Indicium Program (IBIP) specifications. As mentioned, it can also be information regarding the information-related content of the letter 9, in particular the complete information-related content of the letter 9 (thus the document content).

In the present example, as the first partial information the first information includes: information relating to at least one postage-relevant parameter (weight, size etc.) of the letter 9; information relating to an additional service (certified or registered mail, express delivery, etc.) in the transport of the letter 9; information relating to the postage paid or to be paid for the transport of the letter 9 (for example postage amount, value etc.); information relating to the sender of the letter 9 (for example sender, sender address or portions thereof, for example the postal code etc.); information relating to the recipient of the letter 9 (for example recipient, recipient receiver address or portions thereof, for example the postal code etc.); information relating to the carrier of the letter 9 (for example carrier, delivery location etc.); and information relating to the content of the letter 9. It can also be information relating to the physical content of the letter 9 (for example number of the pages, content such as checks, check cards etc.). As mentioned, it can likewise be information that refers to information-related content of the letter 9, for example up to the entire document content.

The franking machine 2 calculates the postage value required for the transport of the letter 9 dependent on the presence of the RFID unit 9.4 and the information content of the information. The carrier selected for the transport of the letter can give graduated rebates (discounts) depending on the extent to which an automated sorting is facilitated due to the presence of the first RFID unit 9.4 and the content of the information stored therein. The maximum rebate, for example, can be achieved when the first RFID unit 9.4 contains the entire receiver address.

The aforementioned first partial information normally sufficiently individualize the letter 9 such that it can be precisely identified at any time using this information. In other embodiments of the invention, however, the letter receives a one-time and unique serial number with which it can be unambiguously identified. This one-time and unique serial number is then likewise stored in the first RFID unit 9.4 as first partial information.

Furthermore, as further partial information the first information can include authentication information SIG1 authenticating the first partial information. This first authentication information SIG1 can be generated in any suitable manner. For example, the authentication information can be a well known Message Authentication Code (MAC) or a well known digital signature over the first partial information.

The aforementioned first partial information can have been transmitted to the franking machine 2 in any suitable manner. In particular the first partial information that relates to the postage-relevant parameters can have been entered by the user of the franking machine 2 or can have been automatically detected by the franking machine 2. The same applies for the remaining first partial information.

In the present example, the information relating to the sender of the letter 9, the information relating to the receiver of the letter 9 and the information relating to the content of the letter 9, have been automatically detected by the franking machine 2 in a manner subsequently described.

In the generation of the document 9.1, in addition to the document content of the document 9.1 (which includes the sender and the receiver) the PC 5 furthermore generates second authentication information SIG2 of the document content in a known manner. This second authentication information SIG2 can be, for example, a digital signature generated using a secret key or it can be a MAC that can be generated in a known manner over the entire document content or predetermined parts of the document content.

In the step 10.1, together with the information relating to the sender and the receiver of the letter 9 this second authentication information SIG2 is written by a writer 8.1 of the printer 9 (controlled by the PC 5) into a second memory device (in the form of a second RFID unit 9.5) in a storage step via a wireless connection. The second RFID unit 9.5 is connected with the letterhead sheet 9.6 of the document 9.1 and thus was likewise associated with the letter 9 in an association step preceding the storage step.

Before the first RFID unit 9.4 is written by the write/read unit 2.3 in the step 10.4, the write/read unit 2.3 initially reads the information stored in the second RFID unit 9.5 (thus, among other things, the second authentication information SIG2 and the information relating to the sender and the receiver of the letter 9) via a wireless connection. The write/read unit 2.3 then writes to the first RFID unit 9.4 in the manner described above, using the information read out from the second RFID unit 9.5 as first partial information.

In a step 10.5, the printing unit 2.4 (connected with the processing and communication unit 2.1) of the franking machine 2 then applies a conventional franking imprint 9.7 onto the franking strip 9.3, and therewith onto the letter 9. the franking imprint 9.7 thereby contains or represents second information that corresponds to the first information stored in the first RFID unit 9.4. Using the franking imprint 9.7, it is possible to retrace the authenticity and integrity of the first information stored in the first RFID unit 9.4.

In other embodiments of the invention, the information printed in the franking imprint and the information stored in the first RFID unit overlap only in part or are in a predetermined relation to one another only in part. This can particularly be the case given only limited storage capacity of the first RFID unit 9.4.

Furthermore, in other embodiments of the invention, only a part of the aforementioned information is stored in the respective RFID unit 9.4. In particular the authentication information can be truncated or compressed in order to reduce the data quantity.

The RFID units 9.4 and 9.5 can be connected with the franking strip 9.3 or the letterhead sheet 9.6 of the document 9.1 in any suitable manner. They can thus be adhered with their respective carrier or be embedded into the respective carrier.

Furthermore, RFID unit 9.4 does not necessarily have to be attached on the letter envelope with a franking strip. Rather, said RFID unit 9.4 can already be connected with the letter envelope itself in the described manner, as is indicated in FIG. 1A by the outline 11.

In other embodiments of the invention, the second RFID unit 9.5 is absent. The franking machine can then possibly have a simple writer at the location of the write/read unit 2.3. The first RFID unit 9.4 can be absent, with the information being written by the franking machine 2 to the second RFID unit 9.5 (instead of to the RFID unit 9.4) on the letterhead sheet 9.6.

In a step 10.6, the letter 9 is then deposited in a first storage device in the form of a first letter box 12. As a system component of the system 1, the letter box 12 comprises a first read and write unit 12.1 that reads the content of the first RFID unit 9.4 via a wireless connection in a read step of the step 10.6.

From the read content of the first RFID unit 9.4, in an acknowledgement step the first read and write unit 12.1 creates first acknowledgement information Q1. The input of the letter 9 into the first letter box 12 is acknowledged and documented with this first acknowledgement information Q1. The first acknowledgement information Q1 thereby preferably comprises an individual identification of the letter 9, for example its one-time and unique serial number, the point in time of the input, an individual identification of the first letter box 12 (for example its one-time and unique serial number) and authentication information about the content of the first acknowledgement information Q1, for example a digital signature or a MAC of the letter box 12.

The first acknowledgement information Q1 so authenticated is then transmitted from the first read and write unit 12.1 to the data center 6 via a connection 13.1 that is wireless at least in segments. Alternatively, a hard wired connection can be provided over the data network 7 as is indicated, for example, by the dashed outline 13.2 in FIG. 1B.

The data center 6 protocols the input of the first acknowledgement information Q1 and provides the first acquisition information Q1 (possibly authenticated again by the data center 6) for retrieval over the data network 7. The PC 5 and/or the franking machine 2 can then retrieve the first acknowledgement information Q1 (possibly after implementation of a check of the access authorization of said PC 5 and/or said franking machine 2) from the data center 6 via the data network 7. Due to the first RFID unit 9.4 linked with the letter 9, a reliable and secure automated shipment tracking thus is possible in a simple manner.

The content read by the first read and write unit 12.1 from the first RFID unit 9.4 is furthermore used in a manner subsequently explained to control the emptying of the first letter box 12. Using the data transmitted by the first read and write unit 12.1, the data center 6 thus registers how many letters are presently located in the first letter box 12. If a specific emptying criterion is fulfilled, as a further system component of the system 1 the data center 6 initiates the emptying of the first letter box 12 in a step 10.7. In other words, the re-forwarding of the letter then ensues in a transport step of the step 10.7, dependent on the read step.

The emptying criterion can be arbitrarily established. For example, a specific number of letters can thus be predetermined; upon reading said number, the emptying is initiated. In the decision as to when the emptying is triggered, the data center 6 may use the postage values of the letters as read from the first RFID unit 9.4. For example, using these postage values the degree of fullness of the letter box 12 can be estimated since the postage value normally depends on the size of the letter. Additionally or alternatively, information (read from the first RFID unit 9.4) about possible selected additional services in the letter transport (such as, for example, express delivery etc.) likewise can be taken into account. The postage value can thus depend thereon, such that a more precise estimation of the degree of fullness of the letter box 12 can be effected.

As a temporal emptying criterion, a specific time span can be established for which the letter located in the letter box 12 for the longest time may reside in the letter box 12 without an emptying occurring. Information (again read from the first RFID unit 9.4) about possible selected additional services in the letter carrying (such as, for example, express delivery) can also be taken into account. Thus the temporal emptying criterion to be considered to be changes dependent on the type of the letters in the letter box 12. For example, a letter with express delivery, newly deposited in the letter box 12, can have the effect that the time span until the triggering of the next emptying of the letter box 12 is significantly shortened.

In other embodiments of the invention, the triggering of the emptying of the letter box 12 ensues not via the data center but rather via the letter box 12. This can monitor the emptying criteria in the manner described above and initiate the emptying via a corresponding signal, for example, to the data center.

Due to the first RFID unit 9.4 linked with the letter 9, the automated monitoring (described above) of one or more emptying criteria is possible that enables an emptying as needed of letter boxes or other storage devices for mail items. A prompt, optimized planning of the driving routes of emptying vehicles etc. is herewith possible. This can be advantageous in rural regions with irregular usage of the letter box 12.

In the step 10.7, the letter 9 is then removed from the first letter box 12 and transferred into a first transport vehicle 14 for re-forwarding. The first transport vehicle 14 has a second read and write unit 14.1 that reads the content of the first RFID unit 9.4 via a wireless connection in a read step of the step 10.7.

In a second acknowledgement step, the second read and write unit 12.1 initially creates second acknowledgement information Q2 from the read content of the first RFID unit 9.4. The input of the letter 9 into the first transport vehicle 14 is acknowledged and documented with this second acknowledgement information Q2. The second acknowledgement information Q2 preferably includes an individual identification of the letter 9 (for example its one-time and unique serial number), the point in time of the input, an individual identification of the first transport vehicle 14 (for example its one-time and unique serial number) and authentication information about the content of the second acknowledgement information Q2, for example a digital signature or a MAC of the first transport vehicle 14.

The second acknowledgement information Q2 so authenticated is then transmitted from the second read and write unit 14.1 to the data center 6 via a connection that is wireless at least in segments. The data center 6 protocols the input of the second acknowledgement information Q2 and provides the second acknowledgement information Q2 (possibly authenticated again by the data center 6) for retrieval over the data network 7. The PC 5 and/or the franking machine 2 can then also retrieve the second acknowledgement information Q2 (possibly after implementation of a check of the access authorization of said PC 5 and/or the franking machine 2) from the data center 6 via the data network 7. Due to the first RFID unit 9.4 linked with the letter 9, a further step of the automated shipment tracking thus is possible in a simple manner.

In other embodiments of the invention, the first letter box 12 generates further acknowledgement information Q1' (similar to the first acknowledgement information Q1) in addition to the second acknowledgement information Q2, which further acknowledgement information Q1' acknowledges and protocols that the letter has left the first letter box 12.

In a step 10.8, the letter 9 is then admitted by the transport vehicle 14 into a letter distribution center 16 (representing a further system component of the system 1) for re-forwarding. The letter distribution center 16 has a processing and communication unit 16.1 and a reader 16.2 connected thereto. In a read step of the step 10.8, the reader 16.2 reads the content of the first RFID unit 9.4 via a wireless connection.

In a third acknowledgement step, the reader 16.2 or the processing and communication unit 16.1 initially creates a third acknowledgement information Q3 from the read content of the first RFID unit 9.4. The input of the letter 9 into the letter distribution center 16 is acknowledged and documented with this third acknowledgement information Q3. The third acknowledgement information Q3 preferably includes an individual identification of the letter 9 (for example its one-time and unique serial number), the point in time of the input into the letter distribution center 16, an individual identification of the letter distribution center 16 (for example its one-time and unique serial number) and authentication information about the content of the third acknowledgement information Q3, for example a digital signature or a MAC of the letter distribution center 16.

The third acknowledgement information Q3 so authenticated is then transmitted from processing and communication unit 16.1 to the data center 6 via the data network 7. The data center 6 protocols the input of the third acknowledgement information Q3 and provides the third acknowledgement information Q3 (possibly authenticated again by the data center 6) for retrieval over the data network 7. The PC 5 and/or the franking machine 2 can then also retrieve the third acknowledgement information Q3 (possibly after implementation of a check of the access authorization of said PC 5 and/or said franking machine 2) from the data center 6 via the data network 7. Due to the first RFID unit 9.4 linked with the letter 9, a further step of the automated shipment tracking is herewith possible in a simple manner.

In other embodiments of the invention, first transport vehicle generates further acknowledgement information Q2' (similar to the second acknowledgement information Q2) in addition to the third acknowledgement information Q3. The further acknowledgement information Q2' acknowledges and protocols that the letter has left the first transport vehicle.

In a step 10.9, the letter 9 is then transferred to a sorting unit 16.3 of the letter distribution center 16, in which sorting unit 16.3 said letter 9 passes through a sorting process. The letters 9 are thereby sorted dependent on the result of the preceding read step by the reader 16.2, thus dependent on the content read from the respective first RFID unit 9.4.

In the present example, the sorting via the sorting unit 16.3 occurs dependent on, among other things, the information stored in the first RFID unit 9.4 and relating to the recipient of the letter 9 and the information relating to the carrier of the letter 9. In other words, due to the first RFID unit 9.4 linked with the letter 9 a simple, automated transport of the letter 9 dependent on the preceding read step also occurs in this transport step (formed by the sorting).

In other embodiments of the invention, the sorting is implemented according to other and/or further criteria. In particular, sorting can also be implemented dependent on information stored in the first RFID unit 9.4 and relating to selected additional services (express delivery etc.).

In a step 10.10, the sorting unit 16.3 generates sorted letter stacks 17 for different mail carriers that are then transferred to second transport vehicles 18, 19 of the different mail carriers in a step 10.11. The second transport vehicle 18, 19 has a third read and write unit 18.1 or 19.1 that reads the content of the first RFID unit 9.4 via a wireless connection in a read step of the step 10.11.

In a fourth acknowledgement step, the third read and write unit 18.1 initially creates fourth acknowledgement information Q4 from the read content of the first RFID unit 9.4. The input of the letter 9 into the second transport vehicle 18 is acknowledged and documented with this fourth acknowledgement information Q4. The fourth acknowledgement information Q4 thereby preferably includes an individual identification of the letter 9 (for example its one-time and unique serial number), the point in time of the input into the second transport vehicle 18, an individual identification of the second transport vehicle 18 (for example its one-time and unique serial number) and authentication information about the content of the fourth acknowledgement information Q4, for example a digital signature or a MAC of the second transport vehicle 18.

The fourth acknowledgement information Q4 so authenticated is then transmitted from the third read and write unit 18.1 to the data center 6 via a connection 20 that is wireless at least in segments. The data center 6 protocols the input of the fourth acknowledgement information Q4 and provides the fourth acknowledgement information Q4 (possibly authenticated again by the data center 6) for retrieval over the data network 7. The PC 5 and/or the franking machine 2 can then also retrieve the fourth acknowledgement information Q4 (possibly after implementation of a check of the access authorization of said PC 5 and/or said franking machine 2) from the data center 6 via the data network 7. Due to the first RFID unit 9.4 linked with the letter 9, a further step of the automated shipment tracking is thereby possible in a simple manner.

In other embodiments of the invention, it can also be provided in turn that the sorting center generates further acknowledgement information Q3' (similar to the third acknowledgement information Q3) in addition to the fourth acknowledgement information Q4, which further acknowledgement information Q3' acknowledges and protocols that the letter has left the first sorting center.

In a step 10.12, the letter is then deposited into a second storage device in the form of a second letter box 21 of the recipient of the letter 9. In the present case, this is the letter box of the authority to which the legal pleading 9.1 is directed. The letter box 21 has a fourth read and write unit 21.1 that reads the content of the first RFID unit 9.4 and the second RFID unit 9.5 via a wireless connection in a read step of the step 10.12.

In a fifth acknowledgement step, the fourth read and write unit 21.1 initially creates a fifth acknowledgement information Q5 from the read content of the first RFID unit 9.4 and the second RFID unit 9.5. The input of the letter 9 into the second letter box 21 is acknowledged and documented with this fifth acknowledgement information Q5. The fifth acknowledgement information Q5 preferably includes an individual identification of the letter 9 (for example its one-time and unique serial number), the point in time of the input into the second letter box 21, an individual identification of the second letter box 21 (for example its one-time and unique serial number), the second authentication information SIG2 created via the document content and authentication information about the content of the fifth acknowledgement information Q5, for example a digital signature or a MAC of the second letter box 21. In order to generate forensically (legally) usable fifth acknowledgement information Q5, the second letter box 21 has a corresponding secure timestamp module 21.1. which generates (in a known manner) a correspondingly manipulation-protected time stamp as documentation for the point in time of the input of the letter 9, which time stamp is incorporated into the fifth acknowledgement information Q5.

The fifth acknowledgement information Q5 so authenticated is then transmitted from the fourth read and write unit 21.1 to the data center 6 via the data network 7. Alternatively, a connection that is wireless at least in segments can be provided, as is indicated by the dashed outline 22 in FIG. 1D.

The data center 6 protocols the input of the fifth acknowledgement information Q5 and provides the fifth acquisition information Q5 (possibly authenticated again by the data center 6) for retrieval over the data network 7. The PC 5 and/or the franking machine 2 then can also retrieve the fifth acknowledgement information Q5 (possibly after implementation of a check of the access authorization of said PC 5 and/or the franking machine 2) from the data center 6 via the data network 7. Alternatively, the data center 6 can actively transmit the fifth acknowledgement information Q5 to the PC 5 and/or the franking machine 2 via the data network 7 after generation of said fifth acknowledgement information Q5. Due to the first RFID unit 9.4 linked with the letter 9, a further automated step of the shipment tracking is possible in a simple manner.

The fifth acknowledgement information Q5 actively transmitted to the PC 5 and/or the franking machine 2 via the data network 7 can then be printed out (automatically or as needed) via the printing unit 2.5 of the franking machine 2 or the printer 8 connected to the PC 5 for the records of the sender of the letter 9.

In the following, a second preferred embodiment of the inventive system 101 for transport of mail pieces is described under reference to FIGS. 2A through 2D, with which inventive system 101 a preferred embodiment of the inventive method for transport of mail pieces can be implemented. The system fundamentally corresponds in functionality and design to the system 1 from FIGS. 1A through 1D, so that here primarily the differences are discussed.

FIGS. 2A through 2D show schematic representations of individual parts of the system 101. Steps that designate individual transitions between different states or transport stations regarding processed mail pieces are symbolized by block arrows in these FIGS. 2A-2D.

Figure 2A:
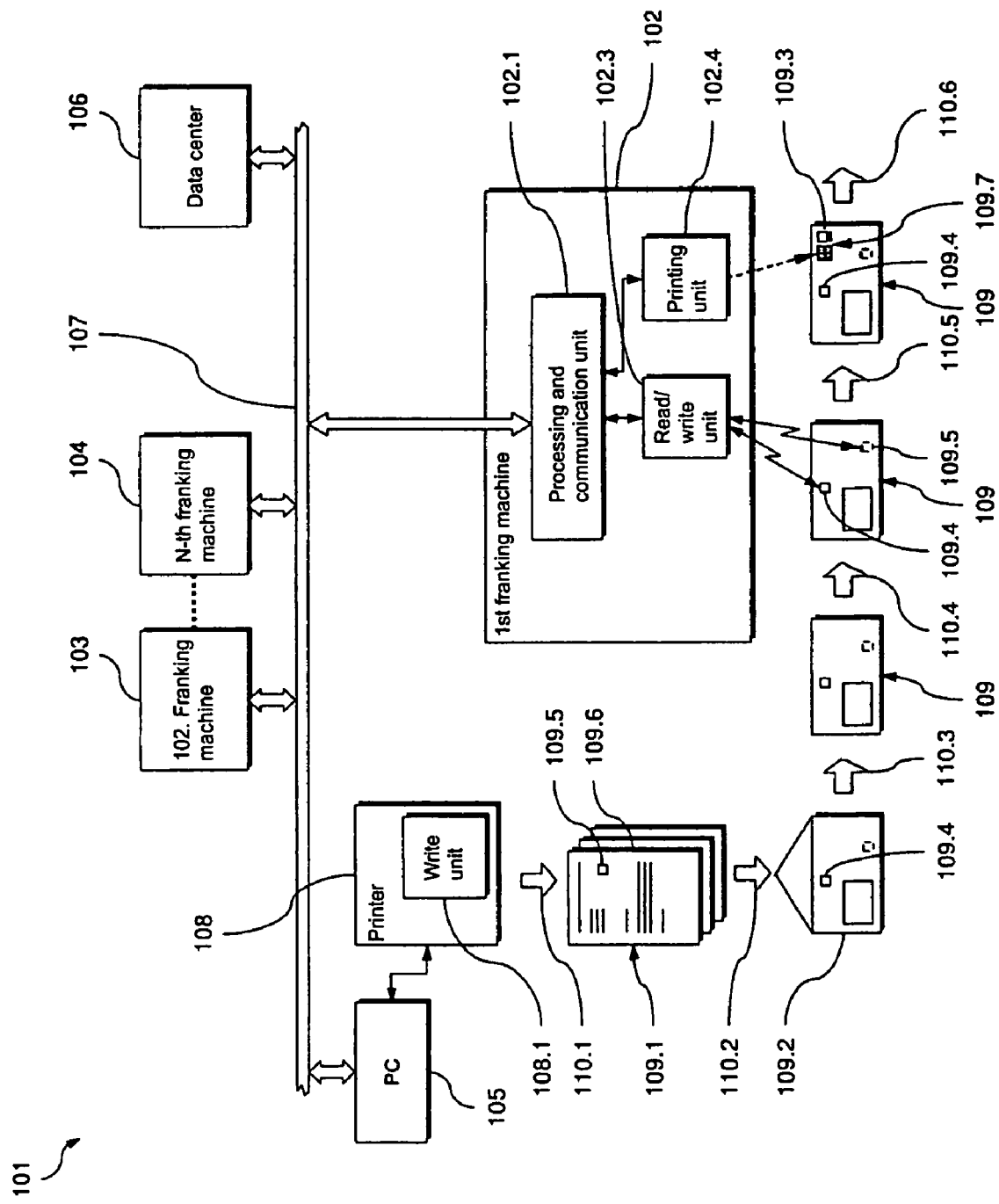
FIG. 2A schematically illustrates a first part of a second preferred embodiment of the inventive system for transport of mail items with which a second preferred embodiment of the inventive method for transport of mail items can be implemented.
Figure 2B:
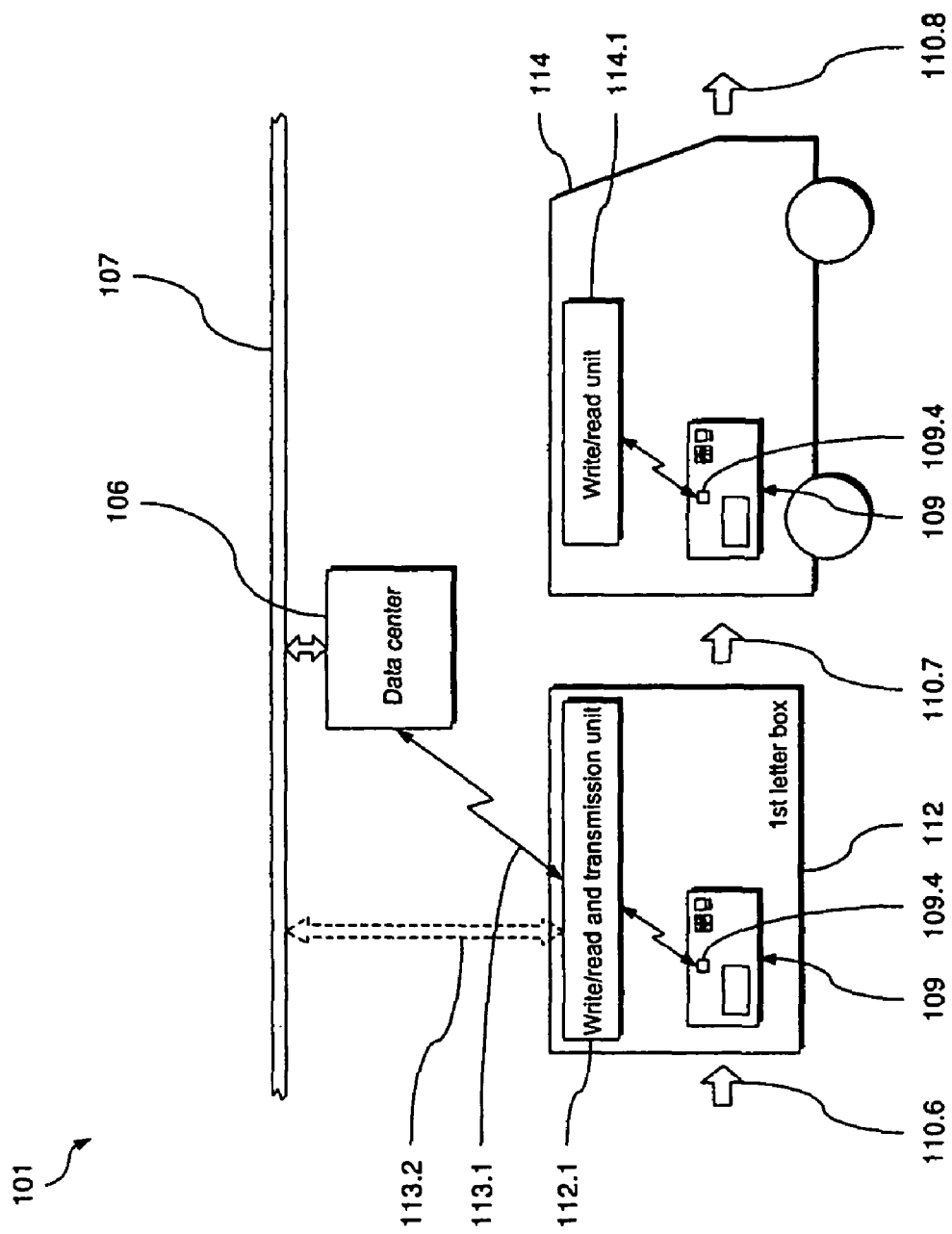
FIG. 2B schematically illustrates a second part of the system of FIG. 2A.
Figure 2C:
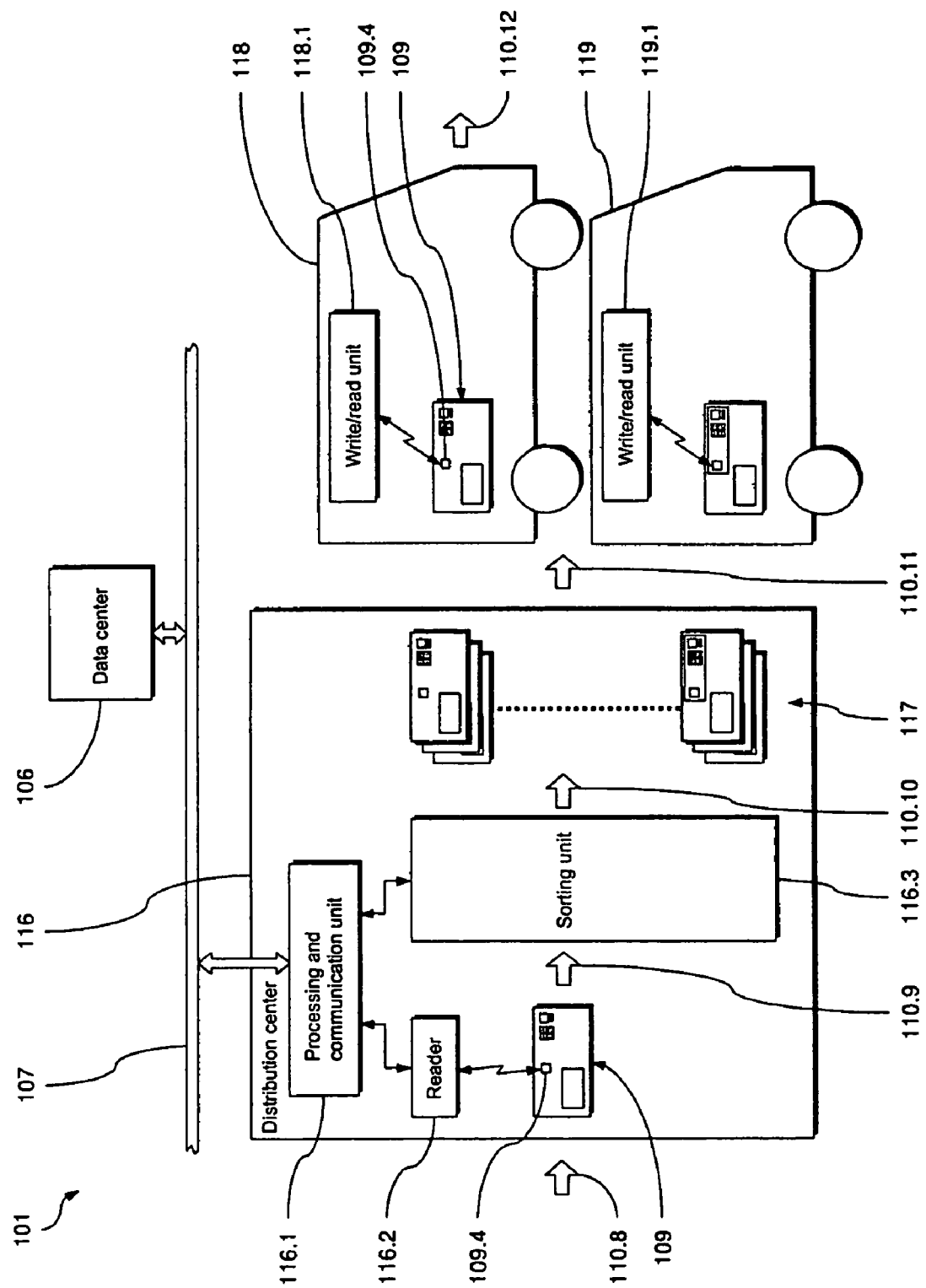
FIG. 2C schematically illustrates a third part of the system of FIG. 2A.
Figure 2D:
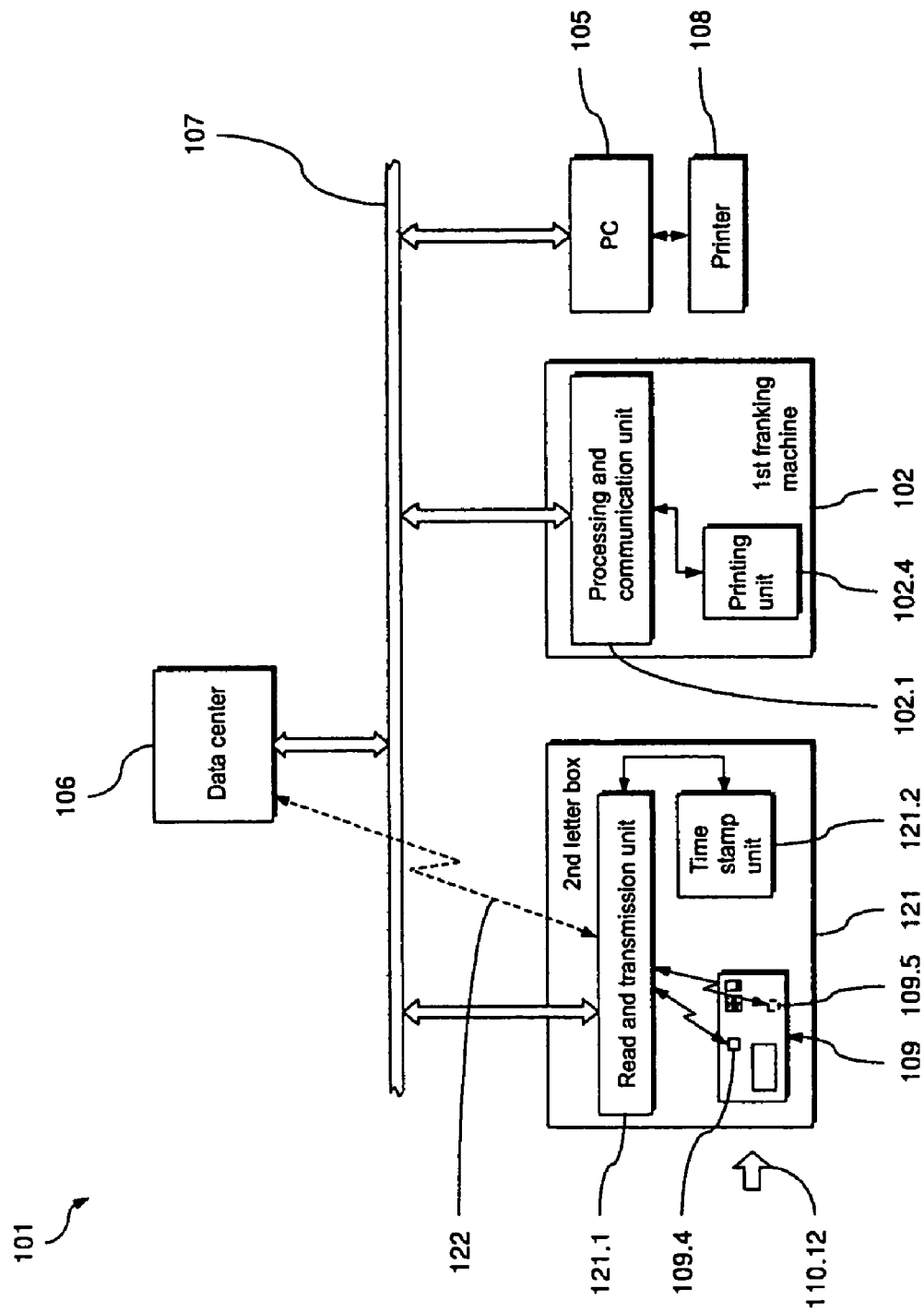
FIG. 2D schematically illustrates a fourth part of the system from FIG. 2A.

As can be seen from FIG. 2A, among other things the system 101 comprises a series of N franking machines 102, 103, 104, a personal computer (PC) 105 and a data center 106. The franking machines 102, 103, 104 and the PC 105 can respectively be connected with the data center 106 via a telecommunication connection (for example a data network 107).

A mail item in the form of a letter 109 is created with the aid of the PC 105. For this, a printer 108 is connected to the PC 105. As a first component of the letter 109, a multi-page document 109.1 with a specific document content (for example a legal pleading) is generated with the PC 105. The document is then printed out via the printer 108 in a step 110.1, folded in a step 110.2 and inserted into a letter envelope 109.2. The letter envelope 109.2 thereby represents a second component of the letter 109. In a preceding association step, a first memory device (fashioned as a type of transponder) in the form of a first RFID unit 109.4 was connected with the letter envelope. For example, this can have already occurred via the manufacturer or a vender of the letter envelope 109.2.

The letter 109 is sealed in a step 110.3 and inserted into the franking machine 102. In a step 110.4, the first RFID unit 109.4 is written with first information via a wireless connection in a storage step, which writing is implemented by a write/read unit 102.3 (connected with the processing and communication unit 102.1) of the franking machine 102. The write/read unit 102.3 writes to the first RFID unit 109.4 according to a method that is known for such RFID units with corresponding transmission and reception components, so that this need not be discussed in detail herein.

During the write process to the first RFID unit 109.4, the letter 109 is already located in the letter channel of the franking machine 102 in which the franking imprint is then also generated. Thanks to the (typically precisely) defined letter handling in the franking machine 102, the letter 109 (and therewith the RFID unit 109.4 attached on it) are accordingly located in a comparably very precisely-defined spatial relationship with the write/read unit 102.3, such that the write process proves to be particularly simple and reliable.

The first RFID 109.4 is written by the write/read unit 102.3 with first information as was described above in connection with the writing of the first RFID unit 9.4 by the write/read unit 2.3, such that the statements above are referenced in this regard (in particular with regard to the information content of the first information).

As in the first exemplary embodiment, the information relating to the sender of the letter 109, the information relating to the receiver of the letter 109 and the information relating to the content of the letter 109 have automatically been detected by the franking machine 102, such that the statements above are referenced in this regard.

In a step 110.5, the printing unit 102.4 (connected with the processing and communication unit 102.1) of the franking machine 102 then applies a conventional franking imprint 109.7 onto the letter envelope 109.2, and therewith onto the letter 109. The franking imprint 109.7 contains or represents second information that corresponds (or, as described above in connection with the first exemplary embodiment, exists in another predetermined relationship relative) to the first information stored in the first RFID unit 109.3. Using the franking imprint 109.7, it is possible to retrace the authenticity and integrity of the first information stored in the first RFID unit 109.3, and vice versa.

In other embodiments of the invention, only a portion of the information cited above is stored in the respective RFID unit. It can in particular be provided that the respective authentication information is truncated in order to reduce the data quantity.

In other embodiments of the invention, the second RFID unit 109.5 is absent. The franking machine can then possibly have a simple writer at the location of the write/read unit 102.3. Likewise the first RFID unit 109.4 connected with the letter envelope can be absent and the information is written by the franking machine 102 to the second RFID unit 109.5 (instead of to the first RFID unit 109.4) on the letterhead sheet 109.6.

In a step 110.6, the letter 109 is then deposited into a first storage device in the form of a first letter box 112. The letter box 112 represents a first transport station in the sense of the present invention. As a system component of the system 101, the letter box 112 comprises a first write/read and transmission unit 112.1 that reads the content of the first RFID unit 109.4 via a wireless connection in a read step of the step 110.6.

From the read contents of the first RFID unit 109.4, the first write/read and transmission unit 112.1 creates first acknowledgement information Q1 in a first acknowledgement step. The input of the letter 109 into the first letter box 112 is acknowledged and documented with this first acknowledgement information Q1. The first acknowledgement information Q1 preferably includes a an individual identification of the letter 109 (for example its one-time and unique serial number), the point in time of the input, an individual identification of the first letter box 112 (for example its one-time and unique serial number) via which the operator of the letter box can also be identified and authentication information about the content of the first acknowledgement information Q1, for example a digital signature or a MAC of the letter box 112.

The first acknowledgement information Q1 so authenticated is then transmitted from the first write/read and transmission unit 112.1 to the data center 106 via a connection 113.1 that is wireless at least in segments. Alternatively, a hard wired connection can be provided over the data network 107 as is indicated by the dashed outline 113.2 in FIG. 2B.

The data center 106 protocols the input of the first acknowledgement information Q1 and provides the first acquisition information Q1 (possibly authenticated again by the data center 106) for retrieval over the data network 107. The PC 105 and/or the franking machine 102 can then retrieve the first acknowledgement information Q1 (possibly after implementation of a check of the access authorization of said PC 105 and/or the franking machine 102) from the data center 106 via the data network 107. Due to the first RFID unit 109.4 linked with the letter 109, a reliable and secure automated shipment tracking is herewith possible in a simple manner.

In order to also enable a reliable and secure automated offline shipment tracking, for example given failure of the connection to the data center 106, in a storage step of the step 110.6 the first write/read and transmission unit 112.1 writes the first acknowledgement information to the first RFID unit 109.4 via a wireless connection as first transport station information. The first write/read and transmission unit 112.1 thus represents an inventive data processing device with which specific data can be written to the first RFID unit 109.4. The first acknowledgement information Q1 can later be read from the first RFID unit 109.4 as first transport station information in order to reconstruct the transport history of the letter 109.

The content read by the first write/read and transmission unit 112.1 from the first RFID unit 109.4 is furthermore used to control the emptying of the first letter box 112 as this was already described in connection with the first exemplary embodiment, such that the above statements are referenced in this regard.

In the step 110.7, the letter 109 is then removed from the first letter box 112 and transferred into a first transport vehicle 114 for re-forwarding. The first transport vehicle 114 represents a second transport station in the sense of the present invention. The first transport vehicle 114 has a second read and write unit 114.1 that reads the content of the first RFID unit 109.4 via a wireless connection in a read step of the step 110.7.

In a second acknowledgement step, the write/read and transmission unit 112.1 initially creates second acknowledgement information Q2 from the read content of the first RFID unit 109.4. The input of the letter 109 into the first transport vehicle 114 is acknowledged and documented with this second acknowledgement information Q1. The second acknowledgement information Q2 preferably includes an individual identification of the letter 109 (for example its one-time and unique serial number), the point in time of the input, an individual identification of the first transport vehicle 114 (for example its one-time and unique serial number) and authentication information about the content of the second acknowledgement information Q2, for example a digital signature or a MAC of the first transport vehicle 114.

In order to enable a reliable and secure automated offline shipment tracking, in a storage step of the step 110.7 the second write/read unit 114.1 then writes the second acknowledgement information Q2 to the first RFID unit 109.4 as second transport station information via a wireless connection. The write/read unit 112.1 thus likewise represents an inventive data processing device with which specific data can be written to the first RFID unit 109.4. The second acknowledgement information Q2 can later be read out from the first RFID unit 109.4 as second transport station information in order to reconstruct the transport history of the letter 109.

In other embodiments of the invention, the first letter box generates further acknowledgement information Q1' (similar to the first acknowledgement information Q1) in addition to the second acknowledgement information Q2, which further acknowledgement information Q1' acknowledges and protocols that the letter has left the first letter box.

In a step 110.8, the letter 109 is then admitted by the transport vehicle 114 into a letter distribution center 116 (representing a further system component of the system 101) for re-forwarding. The letter distribution center 116 includes a processing and communication unit 116.1 and a write/read unit 116.2 connected with this. In a read step of the step 110.8, the write/read unit 16.2 reads the content of the first RFID unit 109.4 via a wireless connection.

In a third acknowledgement step, the reader 116.2 or the processing and communication unit 116.1 initially creates a third acknowledgement information Q3 from the read content of the first RFID unit 109.4. The input of the letter 109 into the letter distribution center 1016 is acknowledged and documented with this third acknowledgement information Q3. The third acknowledgement information Q3 preferably has an individual identification of the letter 109 (for example its one-time and unique serial number), the point in time of the input into the letter distribution center 116, an individual identification of the letter distribution center 116 (for example its one-time and unique serial number) and authentication information about the content of the third acknowledgement information Q3, for example a digital signature or a MAC of the letter distribution center 116.

The third acknowledgement information Q3 so authenticated is then transmitted from the processing and communication unit 116.1 to the data center 106 via the data network 107 and there is provided (in the manner described above in connection with the first exemplary embodiment) for retrieval over the data network 107 for the purposes of shipment tracking.

In order to again enable a reliable and secure automated offline shipment tracking (for example given failure of the connection to the data center 106), in a storage step of the step 110.8 the write/read unit 116.2 then writes the third acknowledgement information Q3 to the first RFID unit 109.4 as third transport station information via a wireless connection. The write/read unit 116.2 thus likewise represents an inventive data processing device with which specific data can be written to the first RFID unit 109.4. The third acknowledgement information Q3 can later be read out from the first RFID unit 109.4 as third transport station information in order to reconstruct the transport history of the letter 109.

In other embodiments of the invention, it can also be provided that the first transport vehicle generates further acknowledgement information Q2' (similar to the second acknowledgement information Q2) in addition to the third acknowledgement information Q3, which further acknowledgement information Q2' acknowledges and protocols that the letter has left the first transport vehicle.

In a step 110.9, the letter 109 is then transferred to a sorting unit 116.3 of the letter distribution center 116, in which sorting unit 116.3 said letter 109 passes through a sorting process dependent on the result of the preceding read step, as it was already described in connection with the first exemplary embodiment, such that the above statements are referenced in this regard.

In a step 110.10, the sorting unit 116.3 generates sorted letter stacks 117 for different mail carriers that are then transferred to second transport vehicles 118, 119 of the different mail carriers in a step 110.11. The second transport vehicle 118, 119 has a write/read unit 118.1 or 19.11 that reads the content of the first RFID unit 109.4 via a wireless connection in a read step of the step 110.11.

In a fourth acknowledgement step, the write/read unit 118.1 initially creates a fourth acknowledgement information Q4 from the read content of the first RFID unit 109.4. The input of the letter 109 into the second transport vehicle 118 is acknowledged and documented with this fourth acknowledgement information Q4. The fourth acknowledgement information Q4 thereby preferably includes an individual identification of the letter 109 (for example its one-time and unique serial number), the point in time of the input into the second transport vehicle 118, an individual identification of the second transport vehicle 118 (for example its one-time and unique serial number) and authentication information about the content of the fourth acknowledgement information Q4, for example a digital signature or a MAC of the second transport vehicle 118.

In order to enable a reliable and secure automated offline shipment tracking, in a storage step of the step 110.11 the write/read unit 118.2 writes the fourth acknowledgement information Q4 to the first RFID unit 109.4 as fourth transport station information via a wireless connection. The write/read unit 118.2 thus likewise represents an inventive data processing device with which specific data can be written to the first RFID unit 109.4. The fourth acknowledgement information Q4 can later be read out from the first RFID unit 109.4 as fourth transport station information in order to reconstruct the transport history of the letter 109.

The sorting center generates further acknowledgement information Q3' (similar to the third acknowledgement information Q3) in addition to the fourth acknowledgement information Q4, which further acknowledgement information Q3' acknowledges and protocols that the letter has left the sorting center. Similar to the third acknowledgement information Q3, the further acknowledgement information Q3' is transmitted to the data center 106 in the manner described above and provided for retrieval.

In a step 110.12, the letter 109 is then dropped into a second storage device in the form of a second letter box 121 of the recipient of the letter 109. In the present case, this is the letter box of the authority to which the legal pleading 109.1 is directed. The letter box 121 has a fourth read and write unit 121.1 that reads the content of the first RFID unit 109.4 and the second RFID unit 109.5 via a wireless connection in a read step of the step 110.12.

In a fifth acknowledgement step, the read and write unit 121.1 initially creates a fifth acknowledgement information Q5 from the read content of the first RFID unit 109.4 and the second RFID unit 109.5. The input of the letter 109 into the second letter box 121 is acknowledged and documented with this fifth acknowledgement information Q5. The fifth acknowledgement information Q5 preferably includes an individual identification of the letter 109 (for example its one-time and unique serial number), the point in time of the input into the second letter box 121, an individual identification of the second letter box 121 (for example its one-time and unique serial number), the second authentication information SIG2 created via the document content and authentication information about the content of the fifth acknowledgement information Q5, for example a digital signature or a MAC of the second letter box 121. In order to generate forensically usable fifth acknowledgement information Q5, the assessable fifth acknowledgement information Q5, the second letter box 121 has a secure timestamp module 121.2 which generates (in a sufficiently known manner) a correspondingly manipulation-protected time stamp as documentation for the point in time of the input of the letter 109, which time stamp is incorporated into the fifth acknowledgement information Q5.

The fifth acknowledgement information Q5 so authenticated is then transmitted from the write/read unit 121.1 to the data center 106 via the data network 7 and there are provided or sent (in the manner described above in connection with the first exemplary embodiment) via the data network 107 for retrieval for purposes of shipment tracking or arrival acknowledgement.

Individual items of or all stored acknowledgement information Q1 through Q4 can be additionally read from the first RFID unit 109.4 and transmitted to the data center 106 in order to there complete the transport history of the letter 109 and be available for retrieval.

The fifth acknowledgement information Q5 actively transmitted to the PC 105 and/or the franking machine 102 via the data network 107 can then be printed out (automatically or as needed) via the printing unit 102.5 of the franking machine 102 or the printer 108 connected to the PC 105 for the records of the sender of the letter 109.

In order to also enable here again a reliable and secure automated offline shipment tracking (for example given failure of the connection with the data center 106), in a storage step of the step 110.12 the write/read and transmission unit 121.1 writes the fifth acknowledgement information Q5 to the first RFID unit 109.4 as fifth transport station information via a wireless connection. The write/read and transmission unit 121.1 thus likewise represents an inventive data processing device with which specific data can be written to the first RFID unit 109.4. The fifth acknowledgement information Q5 can later be read out from the first RFID unit 109.4 as fifth transport station information in order to reconstruct the transport history of the letter 109.

In embodiments of the invention with a purely offline shipment tracking, it can be provided that all acknowledgement information Q1 through Q5 are stored only in the first RFID unit, and that the transport history of the letter is then exclusively reconstructed at a later point in time.

The present invention was described in the preceding using examples of a letter, it is understood that it can also be used in connection with any other mail items, such as packages or the like.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for associating information with a mail item, comprising the steps of:
    physically associating a first electronic memory device with a mail item;
    physically associating a second electronic memory device with said mail item;
    in a storage step, electronically entering only a first portion of first information into said associated first memory device for storage therein;
    in a storage step, electronically entering only a first portion of second information into said associated second memory device for storage therein;
    in a printing step following said storage step, associating a franking imprint with said mail item;
    in said printing step, electronically entering a second portion of said first information into said associated first memory device for storage therein; and
    in said printing step, electronically entering a second portion of said second information into said associated second memory device for storage therein.

2. A method as claimed in claim 1 comprising entering at least one of said first information into said memory device and said second information into said second memory wirelessly.

3. A method as claimed in claim 1 comprising employing at least one RFID memory unit as one of said first memory device and said second memory device.

4. A method as claimed in claim 1 wherein said mail item comprises and outer envelope, and wherein said step of physically associating said first memory device with said mail item comprises physically associating said first memory device with said outer envelope.

5. A method as claimed in claim 1 wherein said mail item comprises an outer envelope and a shipping item contained in said outer envelope, and wherein said step of physically associating said second memory device with said mail item comprises physically associating said second memory device with said shipping item.

6. A method as claimed in claim 1 comprising physically associating said memory device with said mail item before entering said associated information into said memory device.

7. A method as claimed in claim 1 comprising processing said mail item in a franking machine by spatially associating said mail item with said franking machine, and wherein said step of entering said information into said memory device comprises entering said information into said memory device while said mail item is spatially associated with said franking machine.

8. A method as claimed in claim 1 comprising generating said first portion of information and said second portion of information with a predetermined relationship to each other.

9. A method as claimed in claim 1 comprising selecting said first and second information entered into said associated memory device from the group consisting of information relating to at least one postage-relevant parameter of said mail item, information relating to a category of service for transporting said mail item, information relating to a postage paid for transport of said mail item, information relating to a postage to be paid for transport of said mail item, information relating to a sender of said mail item, information relating to a recipient of said mail item, information relating to a carrier of said mail item, information relating to contents of said mail item, information relating to a site at which said information is entered into said memory device, information relating to a point-in-time at which information is entered into said memory device, and information designating a person responsible for entering said information into said storage device.

10. A method as claimed in claim 9 comprising additionally entering authentication information into said associated memory device that authenticates said information.

* * * * *